United States Patent
Zhu

(10) Patent No.: US 11,589,337 B2
(45) Date of Patent: Feb. 21, 2023

(54) CONTROL SIGNALING TRANSMISSION METHOD, AND TERMINAL AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 192 days.

(21) Appl. No.: 16/927,370

(22) Filed: Jul. 13, 2020

(65) Prior Publication Data
US 2020/0344741 A1    Oct. 29, 2020

Related U.S. Application Data

(63) Continuation of application No. PCT/CN2018/075168, filed on Feb. 2, 2018.

(51) Int. Cl.
*H04W 72/04* (2009.01)
*H04L 5/00* (2006.01)

(52) U.S. Cl.
CPC ....... *H04W 72/0406* (2013.01); *H04L 5/0055* (2013.01)

(58) Field of Classification Search
USPC ....... 370/230, 236, 252, 328, 329, 330, 390, 370/395.4, 468
See application file for complete search history.

(56) References Cited

U.S. PATENT DOCUMENTS

| | | |
|---|---|---|
| 2008/0212506 A1 | 9/2008 | Lee et al. |
| 2011/0222491 A1 | 9/2011 | Vajapeyam et al. |
| 2015/0181576 A1* | 6/2015 | Papasakellariou .... H04L 1/0072 370/329 |
| 2015/0264667 A1 | 9/2015 | Lee et al. |
| 2016/0081065 A1 | 3/2016 | Shi et al. |
| 2016/0143017 A1 | 5/2016 | Yang et al. |
| 2016/0353420 A1 | 12/2016 | You et al. |
| 2017/0019216 A1* | 1/2017 | Li ........................ H04W 72/042 |
| 2018/0048448 A1* | 2/2018 | Zhang .................... H04W 88/02 |
| 2018/0139743 A1 | 5/2018 | Yang et al. |
| 2018/0192405 A1* | 7/2018 | Gong ................... H04W 72/042 |
| 2018/0249508 A1 | 8/2018 | Gao et al. |

(Continued)

FOREIGN PATENT DOCUMENTS

| | | |
|---|---|---|
| CN | 101247171 A | 8/2008 |
| CN | 101605356 A | 12/2009 |
| CN | 103929266 A | 7/2014 |

(Continued)

OTHER PUBLICATIONS

Extended European Search Report in the European Application No. 18904429.0, dated Dec. 17, 2020, (8p).

(Continued)

*Primary Examiner* — Nguyen H Ngo
(74) *Attorney, Agent, or Firm* — Arch & Lake LLP

(57) ABSTRACT

User Equipment (UE) determines a location of a resource of at least one control channel for transmission repetition, and the at least one control channel is located in a control region. The UE detects, according to the location of the resource, control signaling transmitted by a base station using the at least one control channel.

12 Claims, 10 Drawing Sheets

UE determines a location of a resource of at least one control channel for repeat — S301

The UE detects, according to the location of the resource, control signaling transmitted by a base station using the at least one control channel — S302

(56) References Cited

U.S. PATENT DOCUMENTS

2018/0324774 A1  11/2018  You et al.

FOREIGN PATENT DOCUMENTS

| CN | 106470468 A | 3/2017 |
|----|-------------|--------|
| EP | 2919402 A1  | 9/2015 |
| EP | 3026829 A1  | 6/2016 |
| JP | 2017063323 A | 3/2017 |
| WO | 2008100072 A1 | 8/2008 |

OTHER PUBLICATIONS

International Search Report in the International Application No. PCT/CN2018/075168, dated Oct. 26, 2018, (4p).
Intel Corporation, "On PDCCH Coreset" 3GPP TSG RAN WG1 #90, R1-1712568, Prague, Czech Republic, dated Aug. 25, 2017, (4p).
First Office Action of the Indian Application No. 202047036157, dated Nov. 25, 2021, (5p).
English translation of the Written Opinion of the International Search Authority in the International Application No. PCT/CN2018/075168, dated Oct. 26, 2018, (3p).

* cited by examiner

CONTROL SIGNALING TRANSMISSION METHOD, AND TERMINAL AND BASE STATION

CROSS-REFERENCE TO RELATED APPLICATIONS

This application is a continuation of International Application No. PCT/CN2018/075168, filed Feb. 2, 2018, the entire content of which is incorporated herein by reference for all purposes.

TECHNICAL FIELD

The present disclosure relates to the field of wireless communication, and more particularly, to a method for transmitting control signaling, User Equipment (UE), and a base station.

BACKGROUND

In a Long Term Evolution (LTE) communication system, a downlink system resource may include a control region and a data region. A control region may be adapted to transmitting control signaling of UE via a Physical Downlink Control Channel (PDCCH). A PDCCH may include a Physical Control Format Indicator Channel (PCFICH), a Physical Hybrid-ARQ Indicator Channel (PHICH), an Enhanced Physical Downlink Shared Channel (EPDCCH), etc. A data region may be adapted to transmitting user data of UE via a Physical Downlink Shared Channel (PDSCH).

SUMMARY

Examples of the present disclosure provide a method for transmitting control signaling, and User Equipment (UE).

According to a first aspect of the present disclosure, a method for transmitting control signaling is the provided. The method may include: determining, by User Equipment (UE), a location of a resource of at least one control channel for transmission repetition, where the at least one control channel may be located in a control region; and detecting, by the UE according to the location of the resource, control signaling transmitted by a base station using the at least one control channel.

According to a second aspect of the present disclosure, a method for transmitting control signaling is provided. The method may include: configuring, by a base station, at least one control channel for transmission repetition, where the at least one control channel may be located in a control region; and transmitting, by the base station, control signaling using the at least one control channel.

According to a third aspect of the present disclosure, User Equipment (UE) is provided. The UE may include a processor and memory, where the memory stores an instruction executable by the processor, and the processor may be adapted to determine a location of a resource of at least one control channel for transmission repetition, where the at least one control channel may be located in a control region; and detect, according to the location of the resource, control signaling transmitted by a base station using the at least one control channel.

It is to be understood that both the foregoing general description and the following detailed description are exemplary and explanatory only and are not restrictive of the present disclosure.

BRIEF DESCRIPTION OF THE ACCOMPANYING DRAWINGS

Drawings here are incorporated in and constitute part of the present disclosure, illustrate examples according to the present disclosure, and together with the present disclosure, serve to explain the principle of the present disclosure.

DETAILED DESCRIPTION

Figure 1:
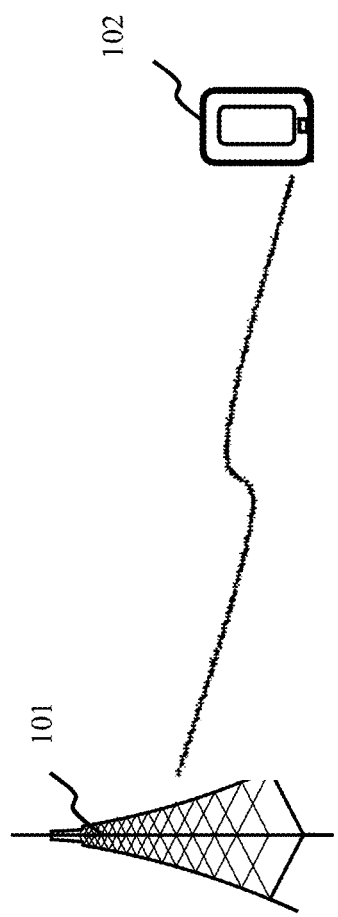
FIG. 1 is a diagram of architecture of a wireless communication system for transmitting control signaling according to an example.

The following description refers to the accompanying drawings, in which identical or similar elements in two drawings are denoted by identical reference numerals unless indicated otherwise. Implementations set forth in the following examples do not represent all implementations in accordance with the present disclosure. Rather, they are mere examples of the device (i.e., apparatus) and method in accordance with certain aspects of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

A control region of a downlink system in a Long Term Evolution (LTE) communication system may occupy an entire bandwidth of each carrier in frequency domain. The control region may occupy a first number of Orthogonal Frequency Division Multiplexing (OFDM) symbols of each sub-frame in time domain. Based on such a structure, a base station may transmit control signaling via a PDCCH in a control region. Then, UE may have to detect a PDCCH in a control region one by one to acquire the control signaling, so as to perform an operation corresponding to the control signaling.

FIG. 1 is a diagram of architecture of a wireless communication system according to an example herein. Referring to FIG. 1, the wireless communication system may include a base station (BS) 101 and User Equipment (UE) 102.

A base station 101 may be adapted to providing various communication services to UE 101. A base station may further be adapted to controlling UE 101 to perform an operation.

UE 102 may be a smart phone, a Personal Digital Assistant (PDA), etc. UE may acquire various communication services from a base station 101. UE may perform an operation corresponding to a control instruction sent by a base station.

Constant emerging of internet applications such as new-generation Augmented Reality (AR)/Virtual Reality (VR), vehicle-to-vehicle communication, etc., has put an increasingly high demand on art of wireless communication, pressing for constant evolution of the art to meet a demand of an application. An important feature of evolving new cellular mobile communication is to support flexible configuration of multiple types of services. A demand on wireless communication may differ depending on the type of a service. For example, an enhanced Mobile Broad Band (eMBB) service may demand a broad band, a high rate, etc. Ultra Reliable Low Latency Communication (URLLC) may demand high reliability, a low delay, etc. Massive Mobile Type Communication (mMTC) may demand a large number of connections. Therefore, a new-generation wireless communication system may have to support transmission of multiple types of services by virtue of a flexible configurable design.

To meet a transmission demand on a new-generation wireless communication system, improvement has to be made to a PDCCH in a control region. A Control Resource Set (CORESET) may be proposed. The CORESET may be adapted to indicating a location of a resource of a control channel in frequency domain. By improving a PDCCH, UE may acquire a CORESET of a control channel, timing for detecting control signaling, etc. Accordingly, the UE may detect the control signaling accurately.

Figure 2:
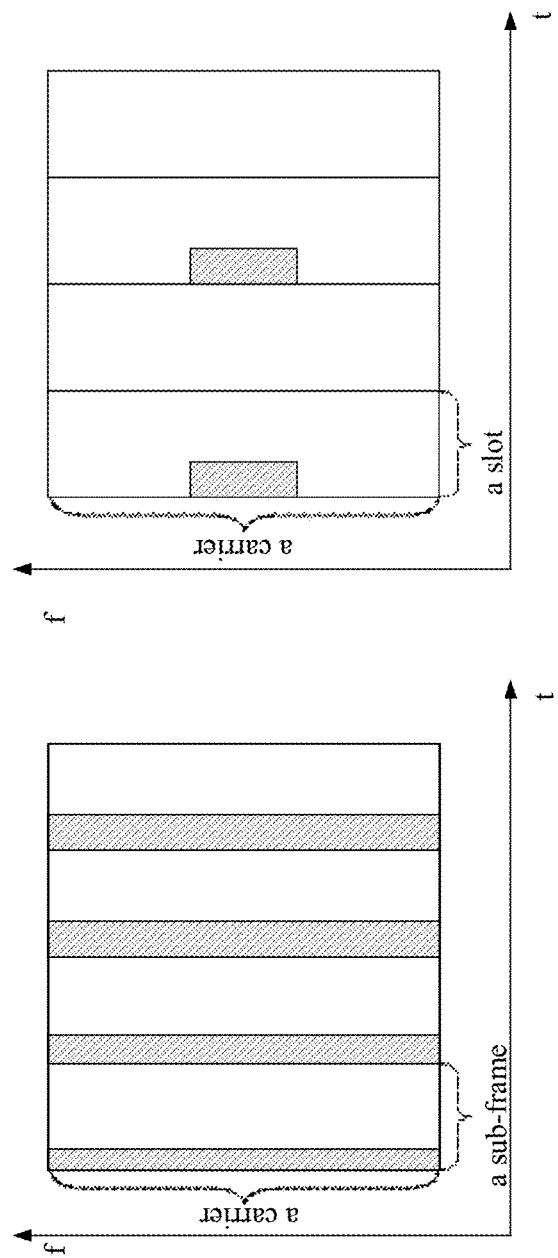
FIG. 2 is a diagram of a control region.

FIG. 2 is a diagram of a control region. A diagram to the left in FIG. 2 is a control region of an existing LTE system. As may be seen in the diagram to the left in FIG. 2, the control region occupies an entire bandwidth of each carrier in frequency domain. The control region occupies a first number of OFDM symbols of each sub-frame in time domain. A diagram to the right in FIG. 2 is a diagram of a control region herein. As may be seen in the diagram to the right in FIG. 2, the control region herein may occupy only part of a bandwidth of a carrier in frequency domain. The control region herein may occupy a first number of OFDM symbols of a sub-frame in time domain. The control region herein may occupy a number of OFDM symbols in the middle of a sub-frame in time domain. The control region herein may occupy a last number of OFDM symbols of a sub-frame in time domain.

Figure 3:
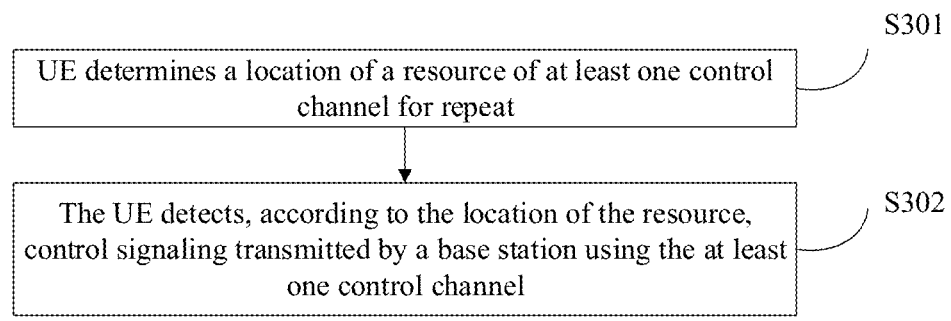
FIG. 3 is a flowchart of a method for transmitting control signaling according to an example.

FIG. 3 is a flowchart of a method for transmitting control signaling according to an example. As shown in FIG. 3, the method for transmitting control signaling may apply to UE. The method may include a step as follows.

In S301, User Equipment (UE) determines a location of a resource of at least one control channel for transmission repetition.

The at least one control channel is located in a control region. A location of a resource according to any example herein may be an accurate location of a resource of a control channel, including a location in time domain, a location in frequency domain, etc. Alternatively, a location of a resource according to any example herein may be a location possibly occupied by a control channel. UE may detect a control channel in need by searching a location of a resource.

In S302, the UE detects, according to the location of the resource, control signaling transmitted by a base station using the at least one control channel.

With examples herein, UE determines a location of a resource of a control channel for transmission repetition. The UE then detects control signaling according to the location of the resource. Accordingly, time required for detecting control signaling is reduced. Control signaling is transmitted with improved reliability.

According to an example herein, the method may include a step as follows.

Before determining the location of the resource of the at least one control channel for transmission repetition, the UE may receive repeat configuration signaling sent by the base station.

According to an example herein, the UE may receive the repeat configuration signaling sent by the base station as follows.

When first-time transmission of the control signaling fails, the UE may receive the control signaling that is repeated.

According to an example herein, the UE may determine the location of the resource of the at least one control channel for transmission repetition as follows.

The UE may determine, according to a pre-defined resource locating rule, the location of the resource of the at least one control channel for repeating the control signaling.

According to an example herein, the UE may determine the location of the resource of the at least one control channel for transmission repetition as follows.

The UE may receive notification signaling sent by the base station. The notification signaling may include the location of the resource of the at least one control channel bearing the control signaling being repeated.

According to an example herein, the UE may detect, according to the location of the resource, the control signaling transmitted by the base station using the at least one control channel as follows.

The UE may acquire, based on indication information in the control signaling first transmitted, a repeat mode of repeating the control signaling. The indication information may be located in an information domain in the control signaling. The information domain may be fixed or configurable. The information domain may be of a fixed or configurable length.

According to an example herein, the UE may detect, according to the location of the resource, the control signaling transmitted by the base station using the at least one control channel as follows.

The UE may determine, based on an identifier in the control signaling, whether the control signaling is the control signaling being repeated. The identifier may be located in an information domain in the control signaling. The information domain may be fixed or configurable. The information domain may be of a fixed or configurable length.

According to an example herein, the method may further include a step as follows.

The UE may decode the control signaling detected in respective control channels separately.

The UE may decode the control signaling detected in respective control channels jointly.

Any aforementioned optional solution may be combined freely to form an optional example herein, which is not elaborated here.

Figure 4:
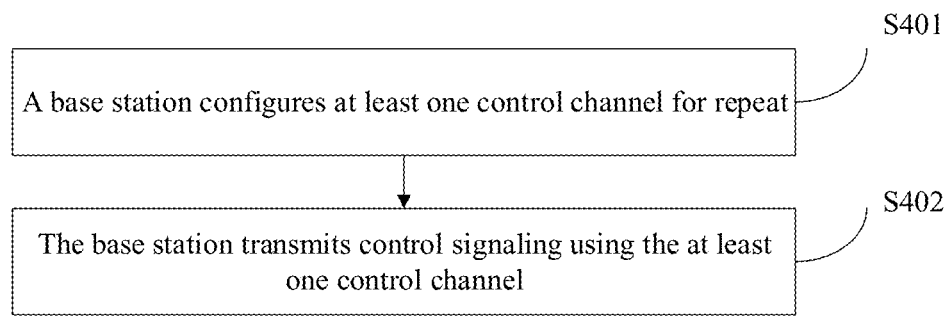
FIG. 4 is a flowchart of a method for transmitting control signaling according to an example.

FIG. 4 is a flowchart of a method for transmitting control signaling according to an example. As shown in FIG. 4, the method for transmitting control signaling may apply to a base station. The method may include a step as follows.

In S401, a base station configures at least one control channel for transmission repetition.

The at least one control channel is located in a control region.

In S402, the base station transmits control signaling using the at least one control channel.

With examples herein, a base station configures a control channel for transmission repetition. The base station transmits control signaling using the control channel. Accordingly, time required for detecting control signaling is reduced. Control signaling is transmitted with improved reliability.

According to an example herein, the base station may configure the at least one control channel for transmission repetition as follows.

The base station may configure, according to a pre-defined number of control channels for transmission repetition, the at least one control channel for transmission repetition.

According to an example herein, the method may further include a step as follows.

After the base station has configured, according to a pre-defined number of control channels for transmission repetition, the at least one control channel for transmission repetition, the base station may send repeat configuration signaling to UE.

According to an example herein, the method may further include a step as follows.

After the base station has configured, according to a pre-defined number of control channels for transmission repetition, the at least one control channel for transmission repetition, the base station may send notification signaling to the UE. The notification signaling may include the location of the resource of the at least one control channel bearing the control signaling being repeated.

According to an example herein, the base station may configure the at least one control channel for transmission repetition as follows.

The base station may configure, according to a type of the UE, the at least one control channel for transmission repetition.

According to an example herein, the base station may configure the at least one control channel for transmission repetition as follows.

The base station may receive feedback information on a control channel where the control signaling is first transmitted.

When the feedback information is a transmission failure message, the base station may select another control channel for transmitting control signaling, till a feedback message of a transmission success message is received, or a repeat number reaches a maximal repeat number.

According to an example herein, the method may further include a step as follows.

The base station may include, in the control signaling to be first transmitted, indication information indicating a repeat mode. The indication information may be located in an information domain in the control signaling. The information domain may be fixed or configurable. The information domain may be of a fixed or configurable length.

According to an example herein, the repeat mode may include an aggregation level, a modulation coding mode, power information for transmitting the control information, etc.

According to an example herein, the method may further include a step as follows.

The base station may include, in the control signaling, an identifier indicating whether the control signaling is the control signaling being repeated. The identifier may be located in an information domain in the control signaling. The information domain may be fixed or configurable. The information domain may be of a fixed or configurable length.

Any aforementioned optional solution may be combined freely to form an optional example herein, which is not elaborated here.

Figure 5:
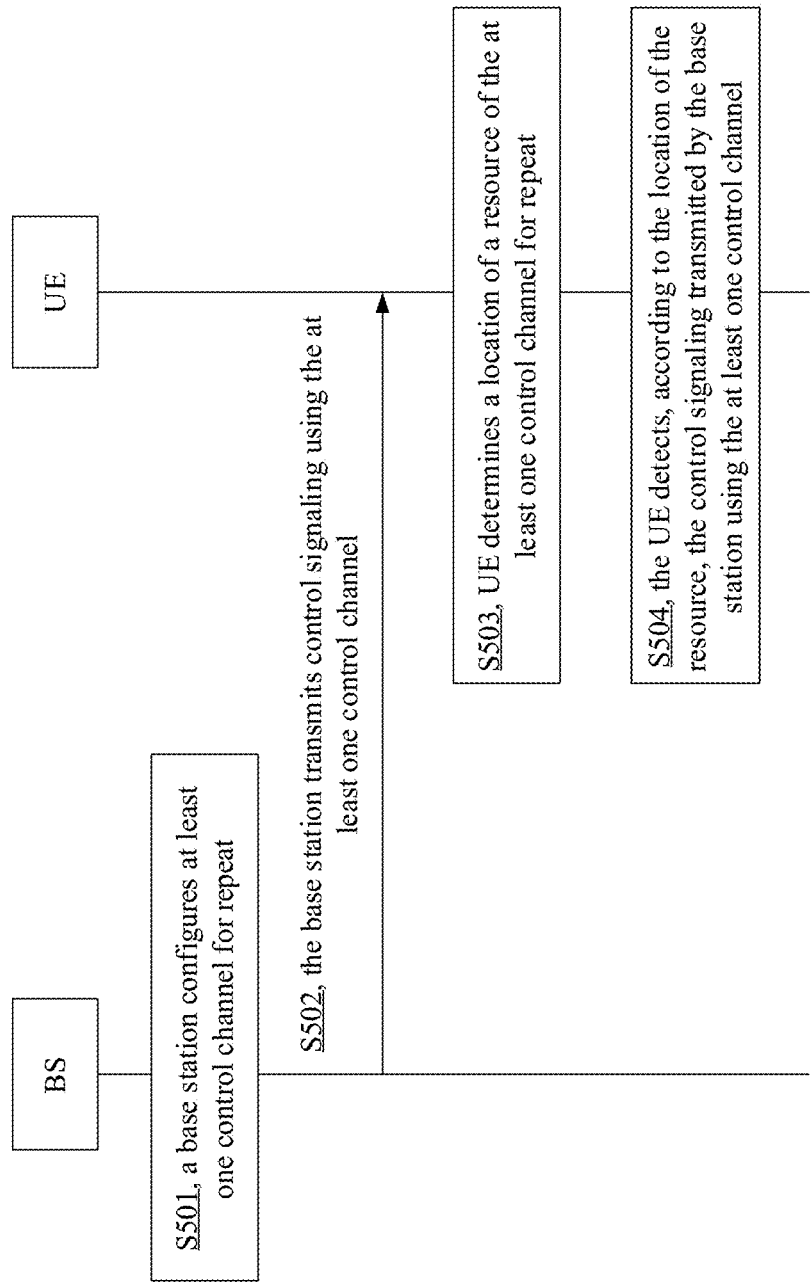
FIG. 5 is a flowchart of a method for transmitting control signaling according to an example.

FIG. 5 is a flowchart of a method for transmitting control signaling according to an example. As shown in FIG. 5, the method for transmitting control signaling may apply to UE and a base station. The method may include a step as follows.

In S501, a base station configures at least one control channel for transmission repetition.

The at least one control channel is located in a control region. The at least one control channel may be adapted to transmitting control signaling.

A base station may configure at least one control channel for transmission repetition in a mode as follows.

In mode 1, a base station may configure at least one control channel for transmission repetition according to a pre-defined number of control channels for transmission repetition, i.e., a number of times control signaling may be repeated.

In the mode, a base station may pre-configure K control channels for transmitting same control signaling. The base station may send configuration signaling to UE. The configuration signaling may instruct the UE to receive the control signaling being repeated. Accordingly, after receiving the repeat configuration signaling, the UE may learn the number of times the control signaling is repeated, and may receive the control signaling being repeated on different control channels.

According to an example herein, a base station may send notification signaling to UE. The notification signaling may be Radio Resource Control (RRC) signaling, Media Access Control (MAC) Control Element (CE) signaling, physical-layer signaling, etc. The notification signaling may include a location of a resource of at least one control channel. Accordingly, the UE may detect control signaling according to the location of the resource of the at least one control channel.

In mode 2, a base station may configure at least one control channel for transmission repetition according to a type of UE.

In mode 2, a base station may configure at least one control channel for transmission according to a type of UE to which signaling is to be transmitted. For example, a base station may configure, for type-A UE, a control channels for transmission repetition. A base station may configure, for type-B UE, b control channels for transmission repetition. Both the a and the b may be pre-configured for UE by the base station via signaling, or may be pre-defined.

Note that after configuring at least one control channel for repeat in the mode, a base station needs to send no repeat configuration signaling to UE. The UE may assume by default that control signaling is repeated.

In mode 3, a base station may configure at least one control channel for transmission repetition based on feedback information on a control channel where control signaling is transmitted.

In the mode, a base station may select a control channel from a control region to transmit control signaling. The base station may acquire feedback information directed at the control signaling first transmitted. If UE feeds back that the control signaling first transmitted is transmitted correctly, the base station may not repeat the control signaling. If the UE feeds back that first transmission of the control signaling fails, the base station may repeat the control signaling, till the base station receives a transmission success message fed back by the UE, or a repeat number reaches a maximal repeat number.

According to an example herein, a base station may include, in a control channel first to transmit control signaling, indication information indicating a repeat mode. Accordingly, the base station may repeat the control signaling in the repeat mode. The indication information may be located in an information domain in the control signaling. The information domain may be fixed or configurable. The information domain may be of a fixed or configurable length. The repeat mode may include an aggregation level, a modulation coding mode, power information for transmitting the control information, etc.

According to an example herein, a base station may include, in control signaling, an identifier indicating whether the control signaling is the control signaling being repeated. Accordingly, when control signaling is transmitted, it may be determined, according to the identifier, whether the control signaling transmitted is the control signaling being repeated. The identifier may be located in an information domain in the control signaling. The information domain may be fixed or configurable. The information domain may be of a fixed or configurable length.

In S502, the base station transmits control signaling using the at least one control channel.

In S503, UE determines a location of a resource of the at least one control channel for transmission repetition.

A location of a resource may include a location in time domain, a location in frequency domain, etc.

UE may determine a location of a resource of at least one control channel for transmission repetition as follows.

In a first mode, UE may determine, according to a pre-defined resource locating rule, a location of a resource of at least one control channel for repeating control signaling.

In the mode, UE may determine a location of a resource of at least one control channel for repeat based on a pre-defined resource locating rule, without requiring a base station to indicate the location of the resource of the at least one control channel for transmission repetition. A pre-defined resource locating rule may be determined according to a received notification. UE may compare a control channel for transmission repetition, to at least one control channel indicated in received notification signaling sent by a base station. Thus, the UE may determine a location of a resource of at least one control channel for transmission repetition according to a location of a resource of the at least one control channel indicated in the notification signaling.

Figure 6:
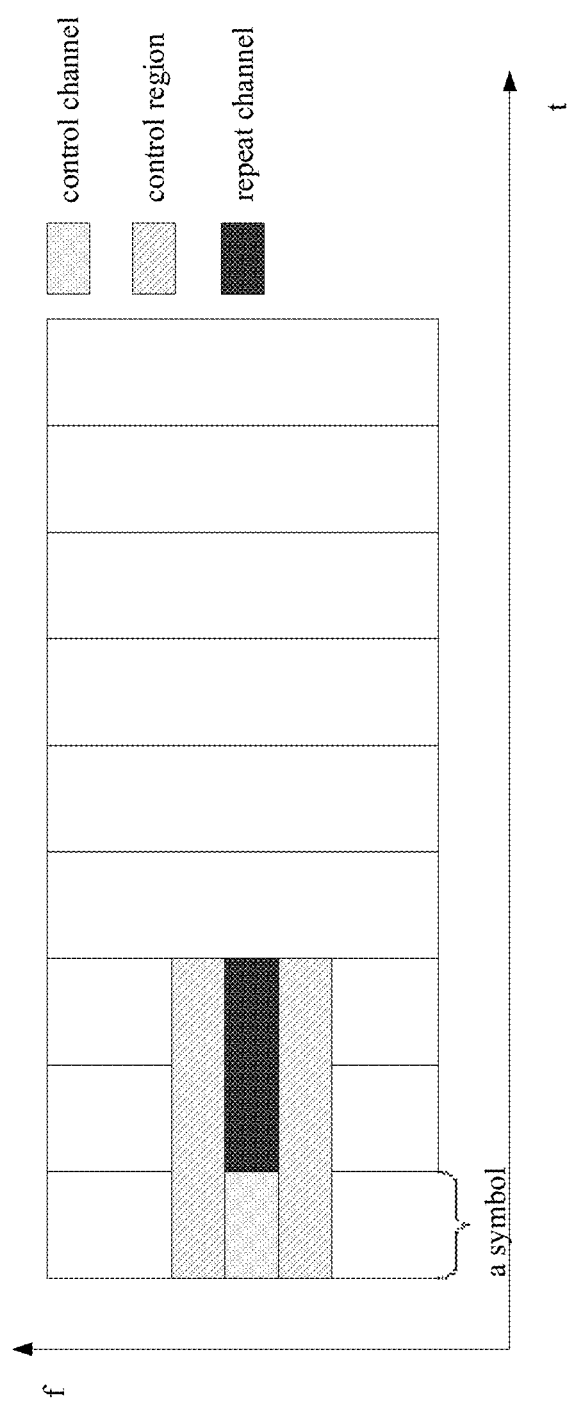
FIG. 6 is a diagram of a control region according to an example.

Referring to FIG. 6, assume that control signaling is transmitted three times. A base station may send a notification instruction to UE within a slot, notifying the UE that first three OFDM symbols of the slot are resources in time domain configured for a CORESET of the UE. According to the notification instruction received, the UE is configured to detect the control signaling on a first OFDM symbol. Then, according to the pre-defined rule, the UE may detect the control signaling being repeated on a second OFDM symbol and a third OFDM symbol.

Figure 7:
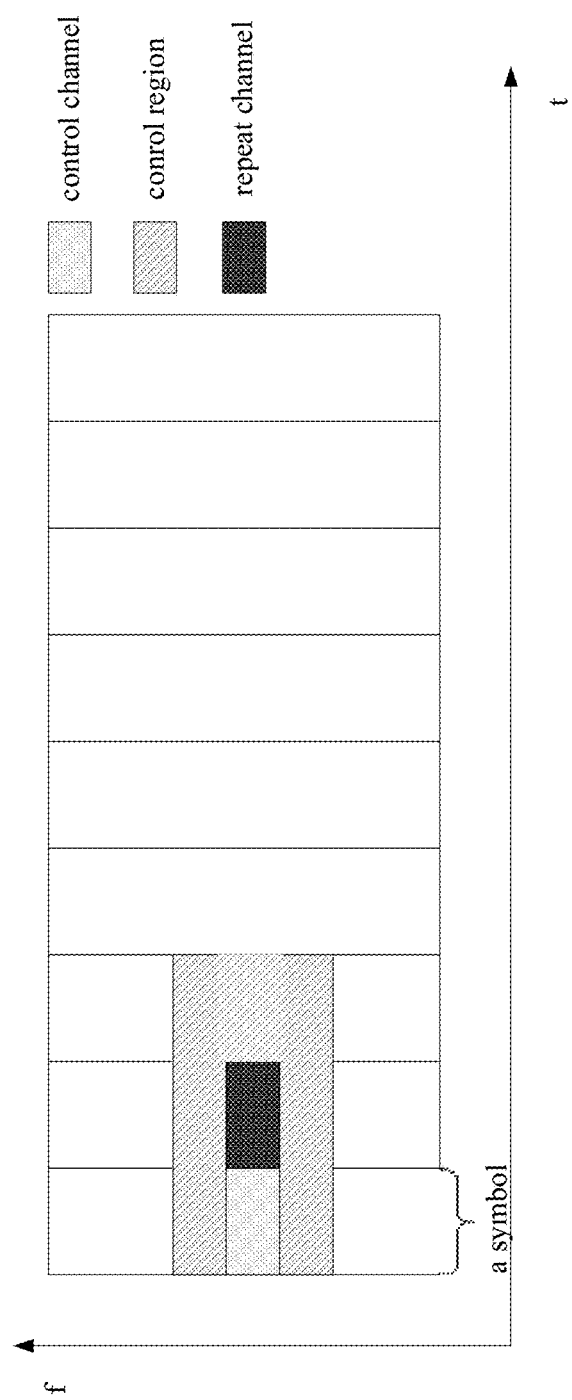
FIG. 7 is a diagram of a control region according to an example.

Referring to FIG. 7, it may be set that control signaling is transmitted twice. A base station may send a notification instruction to UE in a slot, notifying the UE that first three OFDM symbols of the slot are resources in time domain configured for a CORESET of the UE. According to the notification instruction received, the UE is configured to detect the control signaling on a first OFDM symbol. Then, according to the pre-defined rule, the UE may detect the control signaling being repeated on a second OFDM symbol.

In a second mode, UE may acquire a location of a resource of at least one control channel from a notification instruction sent by a base station.

In the mode, UE may receive RRC signaling, MAC CE signaling, physical-layer signaling, a pre-defined rule, etc., sent by a base station. The UE may accordingly determine a location of a resource of a control channel bearing the transmission repetition. To detect a control channel for transmission repetition, the UE may determine a location of a resource occupied by the control channel bearing the transmission repetition based on a location of a CORESET being configured.

In S504, the UE detects, according to the location of the resource, the control signaling transmitted by the base station using the at least one control channel.

UE may detect, according to a location of a resource determined, a control instruction sent by a base station using at least one control channel as follows.

In case I, UE may acquire a repeat mode of repeating control signaling based on indication information in the control signaling first transmitted.

In case II, UE may determine whether control signaling is the control signaling being repeated based on an identifier in the control signaling.

In case III, UE may acquire a repeat mode of repeating control signaling based on indication information in the control signaling first transmitted. The UE may determine whether the control signaling is the control signaling being repeated based on an identifier in the control signaling.

According to an example herein, UE may have to decode control signaling detected in control channels bearing the same control signaling. UE may decode control signaling detected in respective control channels separately. UE may decode control signaling detected in respective control channels jointly.

With examples herein, UE determines a location of a resource of a control channel for transmission repetition. The UE then detects control signaling according to the location of the resource. Accordingly, time required for detecting control signaling is reduced. Control signaling is transmitted with improved reliability.

Figure 8:
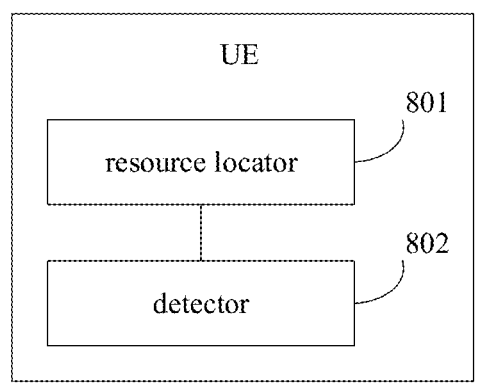
FIG. 8 is a diagram of a structure of UE according to an example.

FIG. 8 is UE according to an example. Referring to FIG. 8, the UE may include a resource locator module 801 and a detector module 801.

The resource locator module 801 may be adapted to determining a location of a resource of at least one control channel for transmission repetition. The at least one control channel is located in a control region.

The detector module 802 may be adapted to detecting, according to the location of the resource, control signaling transmitted by a base station using the at least one control channel.

According to an example herein, the UE may further include a receiver module.

The receiver module may be adapted to, in response to determining that first-time transmission of the control signaling fails, receiving the control signaling being repeated.

According to an example herein, the resource locator module 801 may be adapted to determining, according to a pre-defined resource locating rule, the location of the resource of the at least one control channel for repeating the control signaling.

According to an example herein, the resource locator module 801 may be adapted to receiving notification signaling sent by the base station. The notification signaling may include the location of the resource of the at least one control channel bearing the control signaling being repeated.

According to an example herein, the detector module 802 may be adapted to acquiring, based on indication information in the control signaling first transmitted, a repeat mode of repeating the control signaling. The indication information may be located in an information domain in the control signaling. The information domain may be fixed or configurable. The information domain may be of a fixed or configurable length.

According to an example herein, the detector module 802 may be adapted to determining, based on an identifier in the control signaling, whether the control signaling is the control signaling being repeated. The identifier may be located in an information domain in the control signaling. The information domain may be fixed or configurable. The information domain may be of a fixed or configurable length.

According to an example herein, the UE may further include a decoding module.

The decoding module may be adapted to decoding the control signaling detected in respective control channels separately.

The decoding module may be adapted to decoding the control signaling detected in respective control channels jointly.

With examples herein, UE determines a location of a resource of a control channel for transmission repetition. The UE then detects control signaling according to the location of the resource. Accordingly, time required for detecting control signaling is reduced. Control signaling is transmitted with improved reliability.

A module of the UE according to at least one example herein may perform an operation in a mode elaborated in at least one example of the method herein, which will not be repeated here.

Figure 9:
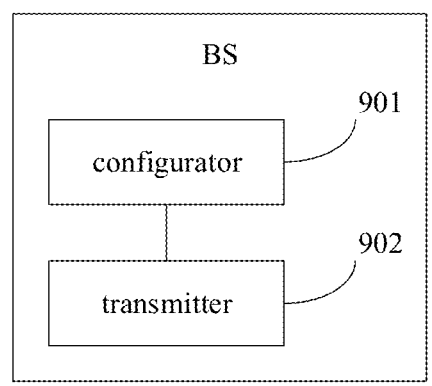
FIG. 9 is a diagram of a structure of a base station according to an example.

FIG. 9 is a base station according to an example. Referring to FIG. 9, the base station may include a configurator module 901 and a transmitter module 902.

The configurator module 901 may be adapted to configuring at least one control channel for transmission repetition. The at least one control channel is located in a control region.

The transmitter module 902 may be adapted to transmitting control signaling using the at least one control channel.

According to an example herein, the configurator module 901 may be adapted to configuring, according to a pre-defined number of control channels for transmission repetition, the at least one control channel for transmission repetition.

According to an example herein, the base station may further include a sender module.

The sender module may be adapted to sending repeat configuration signaling to UE.

According to an example herein, the base station may further include a sender module.

The sender module may be adapted to sending notification signaling to the UE. The notification signaling may include the location of the resource of the at least one control channel bearing the control signaling being repeated.

According to an example herein, the configurator module 901 may be adapted to configuring, according to a type of the UE, the at least one control channel for repeat.

According to an example herein, the configurator module 901 may be adapted to: receiving feedback information on a control channel where the control signaling is first transmitted; in response to determining that the feedback information is a transmission failure message, selecting another control channel for transmitting control signaling, till a feedback message of a transmission success message is received, or a repeat number reaches a maximal repeat number.

According to an example herein, the base station may further include an information including module.

The information including module may be adapted to including, in the control signaling to be first transmitted, indication information indicating a repeat mode. The indication information may be located in an information domain in the control signaling. The information domain may be fixed or configurable. The information domain may be of a fixed or configurable length.

According to an example herein, the repeat mode may include an aggregation level, a modulation coding mode, power information for transmitting the control information, etc.

According to an example herein, the base station may further include an information including module.

The information including module may be adapted to including, in the control signaling, an identifier indicating whether the control signaling is the control signaling being repeated. The identifier may be located in an information domain in the control signaling. The information domain may be fixed or configurable. The information domain may be of a fixed or configurable length.

With examples herein, a base station configures a control channel for transmission repetition. The base station transmits control signaling using the control channel. Accordingly, time required for detecting control signaling is reduced. Control signaling is transmitted with improved reliability.

A module of the base station according to at least one example herein may perform an operation in a mode elaborated in at least one example of the method herein, which will not be repeated here.

Figure 10:
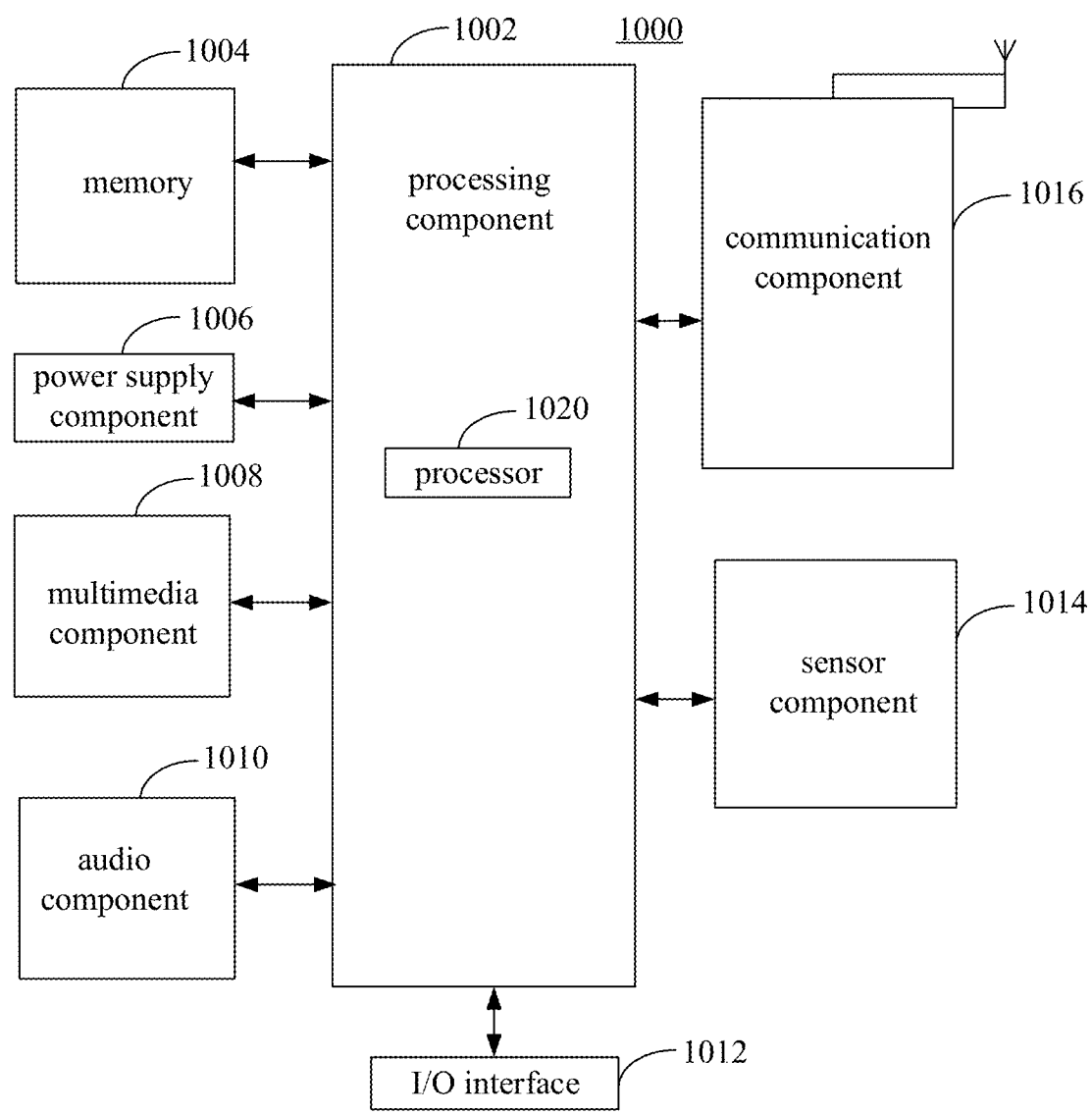
FIG. 10 is a block diagram of a device for transmitting control signaling according to an example.

FIG. 10 is a block diagram of a device 1000 for transmitting control signaling according to an example. For example, the device 1000 may be UE such as a mobile phone, a computer, a digital broadcast terminal, messaging equipment, a gaming console, tablet equipment, medical equipment, exercise equipment, a personal digital assistant, etc.

Referring to FIG. 10, the device 1000 may include at least one of a processing component 1002, memory 1004, a power supply component 1006, a multimedia component 1008, an audio component 1010, an Input/Output (I/O) interface 1012, a sensor component 1014, or a communication component 1016.

The processing component 1002 may generally control an overall operation of the device 1000, such as operations associated with display, a telephone call, data communication, a camera operation, a recording operation, etc. The processing component 1002 may include one or more processors 1020 to execute instructions so as to complete all or a part of an aforementioned method. In addition, the processing component 1002 may include one or more modules to facilitate interaction between the processing component 1002 and other components. For example, the processing component 1002 may include a multimedia portion to facilitate interaction between the multimedia component 1008 and the processing component 1002.

The memory 1004 may be adapted to storing various types of data to support the operation at the device 1000. Examples of such data may include instructions of any application or method adapted to operating on the device 1000, contact data, phonebook data, messages, pictures, videos, etc. The memory 1004 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1006 may supply electric power to various components of the device 1000. The power supply component 1006 may include a power management system, one or more power sources, and other components related to generating, managing, and distributing electricity for the device 1000.

The multimedia component 1008 may include a screen that provides an output interface between the device 1000 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1008 may include at least one of a front camera or a rear camera. When the device 1000 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1010 may be adapted to outputting and/or inputting an audio signal. For example, the audio component 1010 may include a microphone (MIC). When the device 1000 is in an operation mode such as a call mode, a recording mode, a voice recognition mode, etc., the MIC may be adapted to receiving an external audio signal. The received audio signal may be further stored in the memory 1004 or may be sent via the communication component 1016. The audio component 1010 may further include a loudspeaker adapted to outputting the audio signal.

The I/O interface 1012 may provide an interface between the processing component 1002 and a peripheral interface portion. Such a peripheral interface portion may be a keypad, a click wheel, a button, etc. Such a button may include but is not limited to at least one of a homepage button, a volume button, a start button, or a lock button.

The sensor component 1014 may include one or more sensors for assessing various states of the device 1000. For example, the sensor component 1014 may detect an on/off state of the device 1000 and relative positioning of components such as the display and the keypad of the device 1000. The sensor component 1014 may further detect a change in the position of the device 1000 or of a component of the device 1000, whether there is contact between the device 1000 and a user, the orientation or acceleration/deceleration of the device 1000, a change in the temperature of the device 1000, etc. The sensor component 1014 may include a proximity sensor adapted to detecting existence of a nearby object without physical contact. The sensor component 1014 may further include an optical sensor such as a Complementary Metal-Oxide-Semiconductor (CMOS) or a Charge-Coupled-Device (CCD) image sensor used in an imaging application. The sensor component 1014 may further include an acceleration sensor, a gyroscope sensor, a magnetic sensor, a pressure sensor, a temperature sensor, etc.

The communication component 1016 may be adapted to facilitating wired or wireless communication between the device 1000 and other equipment. The device 1000 may access a wireless network based on a communication standard such as Wi-Fi, 2G, 3G . . . , or a combination thereof. The communication component 1016 may broadcast related information or receive a broadcast signal from an external broadcast management system via a broadcast channel. The communication component 1016 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 1000 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 1004 including instructions, may be provided. The instructions may be executed by the processor 1020 of the device 1000 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Examples herein provide a method for transmitting control signaling, User Equipment (UE), and a base station.

According to a first aspect herein, a method for transmitting control signaling includes:

determining, by User Equipment (UE), a location of a resource of at least one control channel for transmission repetition, the at least one control channel being located in a control region; and detecting, by the UE according to the location of the resource, control signaling transmitted by a base station using the at least one control channel.

According to an example herein, the method may further include: before determining, by the UE, the location of the resource of the at least one control channel for transmission repetition, receiving, by the UE, repeat configuration signaling sent by the base station.

According to an example herein, receiving, by the UE, the repeat configuration signaling sent by the base station may include:

in response to determining that first-time transmission of the control signaling fails, receiving, by the UE, the control signaling being repeated.

According to an example herein, determining, by the UE, the location of the resource of the at least one control channel for transmission repetition may include:

determining, by the UE according to a pre-defined resource locating rule, the location of the resource of the at least one control channel for repeating the control signaling.

According to an example herein, determining, by the UE, the location of the resource of the at least one control channel for transmission repetition may include:

receiving, by the UE, notification signaling sent by the base station, the notification signaling including the location of the resource of the at least one control channel bearing the control signaling being repeated.

According to an example herein, detecting, by the UE according to the location of the resource, the control signaling transmitted by the base station using the at least one control channel may include:

acquiring, by the UE based on indication information in the control signaling first transmitted, a repeat mode of repeating the control signaling, the indication information being located in an information domain in the control signaling, the information domain being fixed or configurable, the information domain being of a fixed or configurable length.

According to an example herein, detecting, by the UE according to the location of the resource, the control signaling transmitted by the base station using the at least one control channel may include:

determining, by the UE based on an identifier in the control signaling, whether the control signaling is the control signaling being repeated, the identifier being located in an information domain in the control signaling, the information domain being fixed or configurable, the information domain being of a fixed or configurable length.

According to an example herein, the method may further include:

decoding, by the UE, the control signaling detected in respective control channels separately; or decoding, by the UE, the control signaling detected in respective control channels jointly.

According to a second aspect herein, a method for transmitting control signaling includes:

configuring, by a base station, at least one control channel for transmission repetition, the at least one control channel being located in a control region; and transmitting, by the base station, control signaling using the at least one control channel.

According to an example herein, configuring, by the base station, the at least one control channel for transmission repetition may include:

configuring, by the base station according to a pre-defined number of control channels for transmission repetition, the at least one control channel for transmission repetition.

According to an example herein, the method may further include: after configuring, by the base station according to the pre-defined number of control channels for transmission repetition, the at least one control channel for transmission repetition, sending, by the base station, repeat configuration signaling to UE.

According to an example herein, the method may further include: after configuring, by the base station according to the pre-defined number of control channels for transmission repetition, the at least one control channel for transmission repetition, sending, by the base station, notification signaling to the UE, the notification signaling including the location of the resource of the at least one control channel bearing the control signaling being repeated.

According to an example herein, configuring, by the base station, the at least one control channel for transmission repetition may include:

configuring, by the base station according to a type of the UE, the at least one control channel for transmission repetition.

According to an example herein, configuring, by the base station, the at least one control channel for transmission repetition may include:

receiving, by the base station, feedback information on a control channel where the control signaling is first transmitted;

in response to determining that the feedback information is a transmission failure message, selecting another control channel for transmitting control signaling, till a feedback message of a transmission success message is received, or a repeat number reaches a maximal repeat number.

According to an example herein, the method may further include:

including, by the base station in the control signaling to be first transmitted, indication information indicating a repeat mode, the indication information being located in an information domain in the control signaling, the information domain being fixed or configurable, the information domain being of a fixed or configurable length.

According to an example herein, the repeat mode may include an aggregation level, a modulation coding mode, and power information for transmitting the control information.

According to an example herein, the method may further include:

including, by the base station in the control signaling, an identifier indicating whether the control signaling is the control signaling being repeated, the identifier being located in an information domain in the control signaling, the information domain being fixed or configurable, the information domain being of a fixed or configurable length.

According to a third aspect herein, User Equipment (UE) may include a resource locator module and a detector module.

The resource locator module is adapted to determining a location of a resource of at least one control channel for transmission repetition. The at least one control channel is located in a control region.

The detector module is adapted to detecting, according to the location of the resource, control signaling transmitted by a base station using the at least one control channel.

According to an example herein, the UE may further include a receiver module.

The receiver module may be adapted to receiving repeat configuration signaling sent by the base station.

According to an example herein, the receiver module may be adapted to, in response to determining that first-time transmission of the control signaling fails, receiving the control signaling being repeated.

According to an example herein, the resource locator module may be adapted to determining, according to a pre-defined resource locating rule, the location of the resource of the at least one control channel for repeating the control signaling.

According to an example herein, the resource locator module may be adapted to receiving notification signaling sent by the base station, the notification signaling including the location of the resource of the at least one control channel bearing the control signaling being repeated.

According to an example herein, the detector module may be adapted to acquiring, based on indication information in the control signaling first transmitted, a repeat mode of repeating the control signaling, the indication information being located in an information domain in the control signaling, the information domain being fixed or configurable, the information domain being of a fixed or configurable length.

According to an example herein, the detector module may be adapted to determining, based on an identifier in the control signaling, whether the control signaling is the control signaling being repeated, the identifier being located in an information domain in the control signaling, the information domain being fixed or configurable, the information domain being of a fixed or configurable length.

According to an example herein, the UE may further include a decoding module.

The decoding module may be adapted to decoding the control signaling detected in respective control channels separately.

The decoding module may be adapted to decoding the control signaling detected in respective control channels jointly.

According to a fourth aspect herein, a base station may include a configurator module and a transmitter module.

The configurator module is adapted to configuring at least one control channel for transmission repetition. The at least one control channel is located in a control region.

The transmitter module is adapted to transmitting control signaling using the at least one control channel.

According to an example herein, the configurator module may be adapted to configuring, according to a pre-defined number of control channels for transmission repetition, the at least one control channel for transmission repetition.

According to an example herein, the base station may further include a sender module.

The sender module may be adapted to sending repeat configuration signaling to UE.

According to an example herein, the base station may further include a sender module.

The sender module may be adapted to sending notification signaling to the UE, the notification signaling including the location of the resource of the at least one control channel bearing the control signaling being repeated.

According to an example herein, the configurator module may be adapted to configuring, according to a type of the UE, the at least one control channel for transmission repetition.

According to an example herein, the configurator module may be adapted to: receiving feedback information on a control channel where the control signaling is first transmitted; in response to determining that the feedback information is a transmission failure message, selecting another control channel for transmitting control signaling, till a feedback message of a transmission success message is received, or a repeat number reaches a maximal repeat number.

According to an example herein, the base station may further include an information including module.

The information including module may be adapted to including, in the control signaling to be first transmitted, indication information indicating a repeat mode, the indication information being located in an information domain in the control signaling, the information domain being fixed or configurable, the information domain being of a fixed or configurable length.

According to an example herein, the repeat mode may include an aggregation level, a modulation coding mode, and power information for transmitting the control information.

According to an example herein, the base station may further include an information including module.

The information including module may be adapted to including, in the control signaling, an identifier indicating whether the control signaling is the control signaling being repeated, the identifier being located in an information domain in the control signaling, the information domain being fixed or configurable, the information domain being of a fixed or configurable length.

According to a fifth aspect herein, a device for transmitting control signaling may include a processor and memory.

The memory is adapted to storing an instruction executable by the processor.

The processor is adapted to:

determining a location of a resource of at least one control channel for transmission repetition, the at least one control channel being located in a control region; and detecting, according to the location of the resource, control signaling transmitted by a base station using the at least one control channel.

According to a sixth aspect herein, a device for transmitting control signaling may include a processor and memory.

The memory is adapted to storing an instruction executable by the processor.

The processor is adapted to:

configuring at least one control channel for transmission repetition, the at least one control channel being located in a control region; and transmitting control signaling using the at least one control channel.

The technical solution provided by examples herein may include beneficial effects as follows.

UE determines a location of a resource of a control channel for transmission repetition. The UE then detects control signaling according to the location of the resource. Accordingly, time required for detecting control signaling is reduced. Control signaling is transmitted with improved reliability.

A non-transitory computer-readable storage medium has stored thereon instructions which, when executed by a processor of mobile UE, allow the mobile UE to implement a method for transmitting control signaling herein.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to a person having ordinary skill in the art that has considered the specification and or practiced the present disclosure. The present disclosure is intended to cover any variation, use, or adaptation of the present disclosure following the general principles of the present disclosure and including such departures from the present disclosure as come within common knowledge or customary practice in the art.

Note that the present disclosure is not limited to the exact construction that has been described above and illustrated in the accompanying drawings, and that various modifications and changes may be made to the present disclosure without departing from the scope of the present disclosure.

What is claimed is:

1. A method for transmitting control signaling, comprising:
    receiving, by User Equipment (UE), control signaling transmitted by a base station;
    acquiring, by the UE based on indication information in the control signaling, a repeat mode of repeating the control signaling, wherein the repeat mode comprises an aggregation level, a modulation coding mode, and power information for repeating transmission of the control signaling;
    determining, by the UE, a location of a resource of at least one control channel for transmission repetition, wherein the at least one control channel is located in a control region; and
    detecting, by the UE according to the location of the resource, the control signaling repeated by the base station using the at least one control channel.

2. The method of claim 1, before determining, by the UE, the location of the resource of the at least one control channel for transmission repetition, further comprising:
    receiving, by the UE, repeat configuration signaling sent by the base station.

3. The method of claim 2, wherein receiving, by the UE, the repeat configuration signaling sent by the base station comprises:
    in response to determining that first-time transmission of the control signaling fails, receiving, by the UE, the control signaling being repeated.

4. The method of claim 1, wherein determining, by the UE, the location of the resource of the at least one control channel for transmission repetition comprises:
    determining, by the UE according to a pre-defined resource locating rule, the location of the resource of the at least one control channel for repeating the control signaling.

5. The method of claim 1, wherein determining, by the UE, the location of the resource of the at least one control channel for transmission repetition comprises:
    receiving, by the UE, notification signaling sent by the base station, wherein the notification signaling comprises the location of the resource of the at least one control channel bearing the control signaling being repeated.

6. The method of claim 1, wherein the indication information is located in an information domain in the control signaling, the information domain is fixed or configurable, and the information domain is of a fixed or configurable length.

7. The method of claim 1, wherein detecting, by the UE according to the location of the resource, the control signaling transmitted by the base station using the at least one control channel comprises:
    determining, by the UE based on an identifier in the control signaling, whether the control signaling is the control signaling being repeated, wherein the identifier is located in an information domain in the control signaling, the information domain is fixed or configurable, and the information domain is of a fixed or configurable length.

8. The method of claim 1, further comprising:
    decoding, by the UE, the control signaling detected in control channels separately; or
    decoding, by the UE, the control signaling detected in control channels jointly.

9. User Equipment (UE), comprising a processor and memory, wherein the memory stores a set of instructions that, when executed by the processor, cause the processor to:
    receive control signaling transmitted by a base station;
    acquire, based on indication information in the control signaling, a repeat mode of repeating the control signaling, wherein the repeat mode comprises an aggregation level, a modulation coding mode, and power information for repeating transmission of the control signaling;
    determine a location of a resource of at least one control channel for transmission repetition, wherein the at least one control channel is located in a control region; and
    detect, according to the location of the resource, the control signaling repeated by the base station using the at least one control channel.

10. The UE of claim 9, wherein the set of instructions, when executed by the processor, further cause the processor to receive repeat configuration signaling sent by the base station.

11. The UE of claim 9, wherein the set of instructions, when executed by the processor, further cause the processor to determine, according to a pre-defined resource locating rule, the location of the resource of the at least one control channel for repeating the control signaling.

12. The UE of claim 9, wherein the set of instructions, when executed by the processor, further cause the processor to receive notification signaling sent by the base station, wherein the notification signaling comprises the location of the resource of the at least one control channel bearing the control signaling being repeated.

* * * * *